(12) United States Patent
Schmidtmann et al.

(10) Patent No.: US 10,049,442 B2
(45) Date of Patent: Aug. 14, 2018

(54) VIDEO INSPECTION SYSTEM WITH AUGMENTED DISPLAY CONTENT

(71) Applicant: Mentor Graphics Corporation, Wilsonville, OR (US)

(72) Inventors: Christopher Schmidtmann, Villingen-Schwenningen (DE); Oliver Hartfuß, Villingen-Schwenningen (DE); Sahmusa Akbayir, Villingen-Schwenningen (DE); Jörg Schaaf, Brigachtal (DE); Thomas Koddenberg, Raesfeld (DE); Rainer Oder, Villingen-Schwenningen (DE)

(73) Assignee: Mentor Graphics Corporation, Wilsonville, OR (US)

( * ) Notice: Subject to any disclaimer, the term of this patent is extended or adjusted under 35 U.S.C. 154(b) by 0 days.

(21) Appl. No.: 15/008,661

(22) Filed: Jan. 28, 2016

(65) Prior Publication Data
US 2017/0221197 A1   Aug. 3, 2017

(51) Int. Cl.
*G06T 19/20* (2011.01)
*G06T 7/00* (2017.01)

(52) U.S. Cl.
CPC .. *G06T 7/0006* (2013.01); *G06T 2207/30121* (2013.01); *G06T 2207/30141* (2013.01)

(58) Field of Classification Search
CPC ........... G01N 2021/95638–2121/95669; G06T 2207/30141
See application file for complete search history.

(56) References Cited

U.S. PATENT DOCUMENTS

| | | | | |
|---|---|---|---|---|
| 4,469,553 A | * | 9/1984 | Whitehead | G01R 31/2806 156/378 |
| 5,831,854 A | * | 11/1998 | Yamamoto | H05K 13/0486 700/95 |
| 6,477,266 B1 | * | 11/2002 | Asar | G01N 21/95607 382/144 |
| 7,149,342 B2 | * | 12/2006 | Biazik | G01N 21/95607 382/148 |

(Continued)

OTHER PUBLICATIONS

GenRad, "Introduction to In-Circuit Testing", copyright 1984, GenRad Corporation, no author listed, 123 pages total. (Year: 1984).*

*Primary Examiner* — Brian Werner
(74) *Attorney, Agent, or Firm* — Mentor Graphics Corporation

(57) ABSTRACT

This application discloses a video inspection system for a rework station, which includes multiple image capture devices to capture multiple images or videos of a printed circuit board assembly, a presentation tool to merge the captured images or video into a image or video, and a display device to present the image video. The presentation tool also can augment the captured video of the printed circuit board assembly with information from a layout design of the printed circuit board assembly. The presentation tool can receive a selection of a portion of the layout design or a selection of at least one component in the printed circuit board assembly, and annotate the captured video of the printed circuit board assembly with design data from the layout design that corresponds to the selected portion of the layout design or the selected component in the printed circuit board assembly.

20 Claims, 6 Drawing Sheets

(56) References Cited

U.S. PATENT DOCUMENTS

| | | | |
|---|---|---|---|
| 7,860,587 B2* | 12/2010 | Berg | B41F 33/0036 |
| | | | 348/14.03 |
| 2003/0174877 A1* | 9/2003 | Aiger | G01N 21/95684 |
| | | | 382/145 |
| 2012/0159450 A1* | 6/2012 | Margalit | G06F 9/4446 |
| | | | 717/125 |
| 2015/0084987 A1* | 3/2015 | Hicks | G06Q 10/0875 |
| | | | 345/629 |

* cited by examiner

VIDEO INSPECTION SYSTEM WITH AUGMENTED DISPLAY CONTENT

TECHNICAL FIELD

This application is generally related to electronic laboratories and, more specifically, to video inspection system with augmented display content.

BACKGROUND

Many printed circuit board (PCB) assemblies can be mass produced through automated or semi-automated processes. During production or assembly, a PCB can be populated with electronic components, for example, with through-hole or surface-mount technology, to form the PCB assembly. The electronic components can be attached to the PCB through a variety of soldering techniques. For example, in high volume production, population of the electronic components to the PCB can be performed by a surface-mount placement machine and bulk wave soldering.

There are many situations, however, when skilled technicians manually refinish or repair the electronic PCB assembly, for example, soldering some components using tweezers and a fine tip soldering iron, often with the aid of a microscope. This manual refinish or repair typically occurs during a prototyping stage when components are swapped in a PCB assembly or during a repair process when a manufactured PCB assembly has a defective component and it is more cost-effective to have expert personnel manually remove and replace the defective component using appropriate equipment. This manual refinishing or repair of PCB assemblies is often called rework. Properly carried out, rework can restore functionality of the PCB assembly without significantly affecting its subsequent lifetime.

As sizes and conductor pitch of components to be installed on a printed circuit board have shrunk, the precision of manual placement of those components onto the printed circuit board has increased. Since rework is typically performed manually by expert personnel, the use of highly accurate vision-alignment systems with high resolution and magnification has become ubiquitous. Many soldering rework stations in lab environment utilize optical microscopes during rework of these PCB assemblies. While optical microscopes can provide rework technicians a quality view of the PCB assembly, they are typically difficult to properly calibrate. For example, since microscopes typically only allow a view to a small location on the PCB assembly, for example, just a component or two on the PCB assembly, the calibration of the PCB assembly can include locating the component to perform rework, and then iteratively positioning and focusing the optical microscope until the optical microscope provides a view of the located component.

To help combat the limitations of the optical microscope, some soldering rework stations have replaced optical microscopes with video inspection systems, for example, including a camera to capture a two-dimensional image of the PCB assembly and a monitor to display the captured image. While the electronic inspection systems can allow for a larger view of the PCB assembly as compared to the optical microscope, the two-dimensional image makes performing the rework difficult, due to the lack of depth-perception in the two-dimensional image. Further, since rework often includes soldering, the lack of depth-perception can cause inadvertent contact to the PCB assembly by a soldering iron or a soldering gun, which, due to intense heat, can damage a PCB board or other components in the PCB assembly.

SUMMARY

This application discloses a video inspection system for a rework station, which includes multiple image capture devices to capture multiple images or videos of a printed circuit board assembly, a presentation tool to merge the captured images or video into a captured image or video, and a display device to present the captured image video. The presentation tool also can augment the captured video of the printed circuit board assembly with information from a layout design of the printed circuit board assembly. The presentation tool can receive a selection of a portion of the layout design or a selection of at least one component in the printed circuit board assembly, and annotate the captured video of the printed circuit board assembly with design data from the layout design that corresponds to the selected portion of the layout design or the selected component in the printed circuit board assembly. Embodiments will be described below in greater detail.

DETAILED DESCRIPTION

Illustrative Operating Environment

Figure 1:
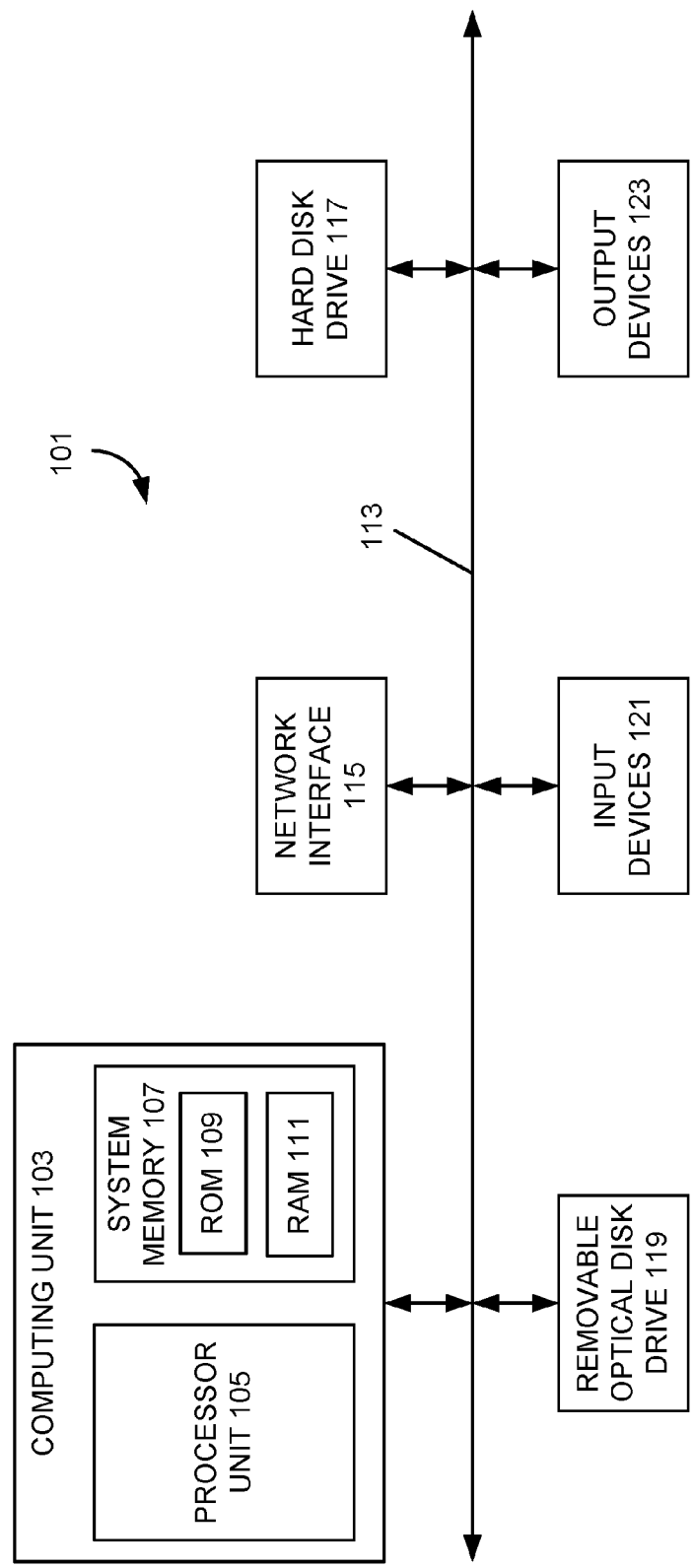
FIGS. 1 and 2 illustrate an example of a computer system of the type that may be used to implement various embodiments of the invention.

Various examples of the invention may be implemented through the execution of software instructions by a computing device 101, such as a programmable computer. Accordingly, FIG. 1 shows an illustrative example of a computing device 101. As seen in this figure, the computing device 101 includes a computing unit 103 with a processing unit 105 and a system memory 107. The processing unit 105 may be any type of programmable electronic device for executing software instructions, but will conventionally be a microprocessor. The system memory 107 may include both a read-only memory (ROM) 109 and a random access memory (RAM) 111. As will be appreciated by those of ordinary skill in the art, both the read-only memory (ROM) 109 and the random access memory (RAM) 111 may store software instructions for execution by the processing unit 105.

The processing unit 105 and the system memory 107 are connected, either directly or indirectly, through a bus 113 or alternate communication structure, to one or more peripheral devices 117-123. For example, the processing unit 105 or the system memory 107 may be directly or indirectly connected to one or more additional memory storage devices, such as a hard disk drive 117, which can be magnetic and/or removable, a removable optical disk drive 119, and/or a flash memory card. The processing unit 105 and the system memory 107 also may be directly or indirectly connected to one or more input devices 121 and one or more output devices 123. The input devices 121 may include, for example, a keyboard, a pointing device (such as a mouse, touchpad, stylus, trackball, or joystick), a scanner, a camera, and a microphone. The output devices 123 may include, for example, a monitor display, a printer and speakers. With various examples of the computing device 101, one or more of the peripheral devices 117-123 may be internally housed with the computing unit 103. Alternately, one or more of the peripheral devices 117-123 may be external to the housing for the computing unit 103 and connected to the bus 113 through, for example, a Universal Serial Bus (USB) connection.

With some implementations, the computing unit 103 may be directly or indirectly connected to a network interface 115 for communicating with other devices making up a network. The network interface 115 can translate data and control signals from the computing unit 103 into network messages according to one or more communication protocols, such as the transmission control protocol (TCP) and the Internet protocol (IP). Also, the network interface 115 may employ any suitable connection agent (or combination of agents) for connecting to a network, including, for example, a wireless transceiver, a modem, or an Ethernet connection. Such network interfaces and protocols are well known in the art, and thus will not be discussed here in more detail.

It should be appreciated that the computing device 101 is illustrated as an example only, and it not intended to be limiting. Various embodiments of the invention may be implemented using one or more computing devices that include the components of the computing device 101 illustrated in FIG. 1, which include only a subset of the components illustrated in FIG. 1, or which include an alternate combination of components, including components that are not shown in FIG. 1. For example, various embodiments of the invention may be implemented using a multi-processor computer, a plurality of single and/or multiprocessor computers arranged into a network, or some combination of both.

Figure 2:
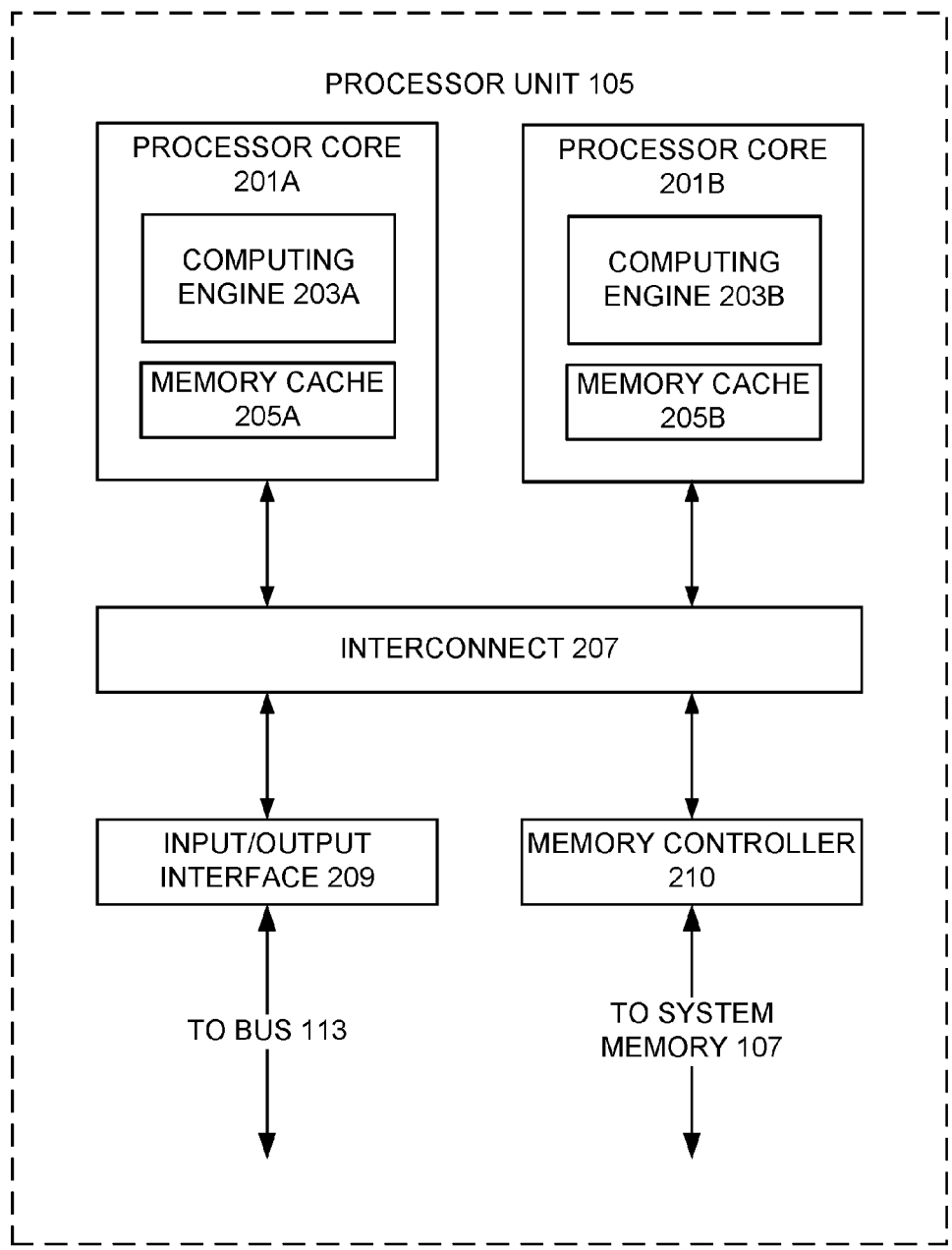

With some implementations of the invention, the processor unit 105 can have more than one processor core. Accordingly, FIG. 2 illustrates an example of a multi-core processor unit 105 that may be employed with various embodiments of the invention. As seen in this figure, the processor unit 105 includes a plurality of processor cores 201A and 201B. Each processor core 201A and 201B includes a computing engine 203A and 203B, respectively, and a memory cache 205A and 205B, respectively. As known to those of ordinary skill in the art, a computing engine 203A and 203B can include logic devices for performing various computing functions, such as fetching software instructions and then performing the actions specified in the fetched instructions. These actions may include, for example, adding, subtracting, multiplying, and comparing numbers, performing logical operations such as AND, OR, NOR and XOR, and retrieving data. Each computing engine 203A and 203B may then use its corresponding memory cache 205A and 205B, respectively, to quickly store and retrieve data and/or instructions for execution.

Each processor core 201A and 201B is connected to an interconnect 207. The particular construction of the interconnect 207 may vary depending upon the architecture of the processor unit 105. With some processor cores 201A and 201B, such as the Cell microprocessor created by Sony Corporation, Toshiba Corporation and IBM Corporation, the interconnect 207 may be implemented as an interconnect bus. With other processor units 201A and 201B, however, such as the Opteron™ and Athlon™ dual-core processors available from Advanced Micro Devices of Sunnyvale, Calif., the interconnect 207 may be implemented as a system request interface device. In any case, the processor cores 201A and 201B communicate through the interconnect 207 with an input/output interface 209 and a memory controller 210. The input/output interface 209 provides a communication interface to the bus 113. Similarly, the memory controller 210 controls the exchange of information to the system memory 107. With some implementations of the invention, the processor unit 105 may include additional components, such as a high-level cache memory accessible shared by the processor cores 201A and 201B. It also should be appreciated that the description of the computer network illustrated in FIG. 1 and FIG. 2 is provided as an example only, and it not intended to suggest any limitation as to the scope of use or functionality of alternate embodiments of the invention.

Video Inspection System with Augmented Display Content

Figure 3:
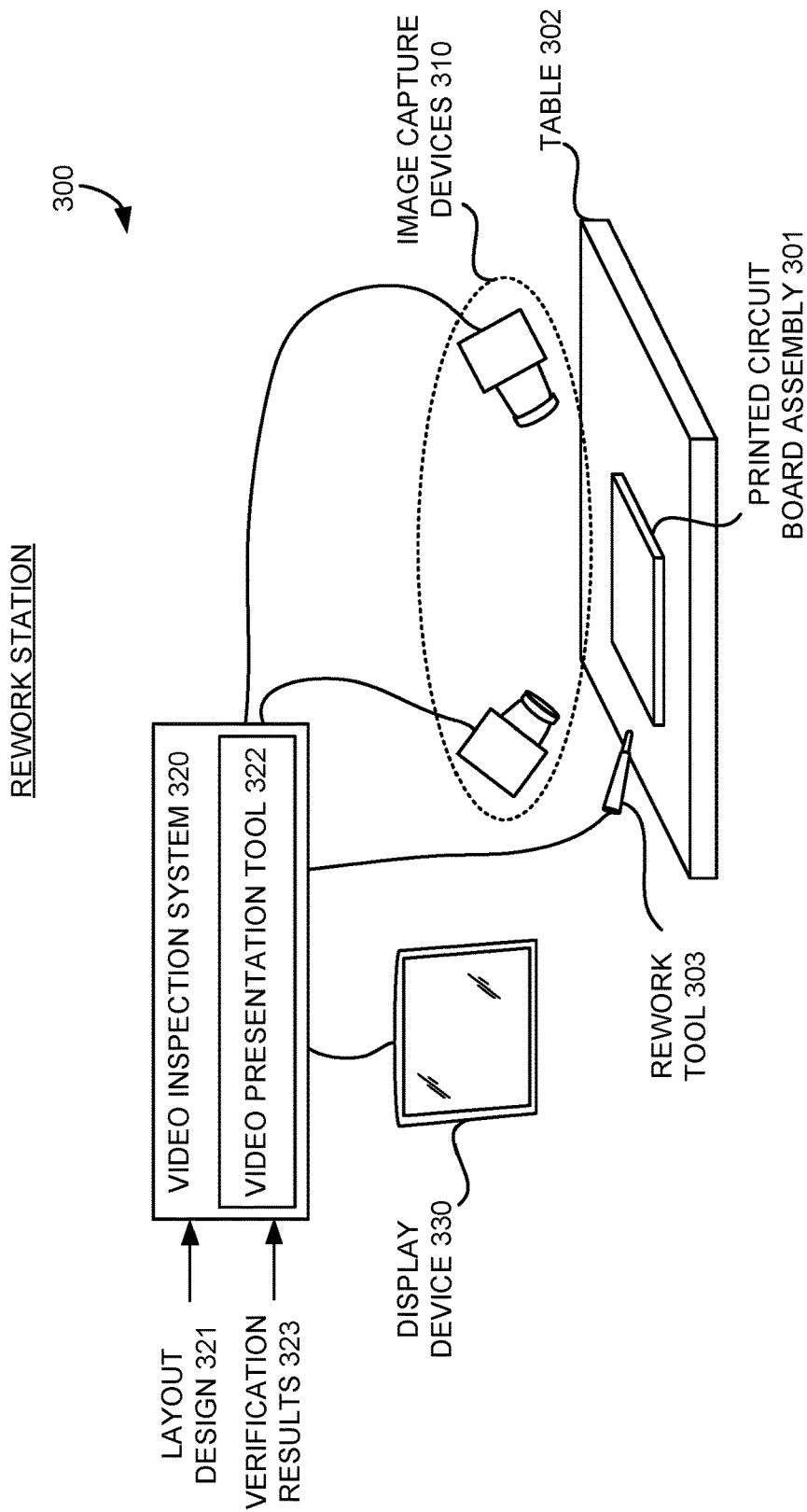
FIG. 3 illustrates an example rework station with layout design-aided visual inspection system according to various examples of the invention.

FIG. 3 illustrates an example rework station 300 with a visual inspection system 320 according to various examples of the invention. Referring to FIG. 3, the rework station can include a printed circuit board (PCB) assembly 301, which may be disposed on a table 302 or other supporting structure. The PCB assembly 301 can include a printed circuit board, in some embodiments, having one or more electronic components affixed thereon. The components can be electronic devices, such as resistors, capacitors, inductors, or the like, packaged integrated circuits, or the like, which can be affixed via through-hole or surface-mount technology to the PCB assembly 301.

The rework station 300 can include multiple image capture devices 310 to capture a video image of the PCB assembly 301. In some embodiments, the image capture devices 310 can include video cameras or other image capture devices capable of capturing video or images of the PCB assembly 301. Although FIG. 3 shows two image capture devices, in other embodiments, the image capture devices 310 can include any number of video cameras or other image capture devices.

The rework station 300 can include a video inspection system 320 to receive captured images or video of the PCB assembly 301 from the image capture devices 310. The video inspection system 320 can include a computing system, such as the computing device 101 described in FIGS. 1 and 2, configured to implement a video presentation tool 322. The video presentation tool 322 can merge or aggregate the captured images or video of the PCB assembly 301 into a two-dimensional or three-dimensional image or video, which can be displayed on a display device 330. The display device 330 can be a television or other display configured to present two-dimensional images or three-dimension stereoscopic images, which can convey a depth perception to a viewer with or without viewing glasses.

The video presentation tool 322 also can augment the captured image or video with design data from a design of the PCB assembly 301, such as a layout design 321 of the PCB assembly 301 or schematic design of the PCB assembly 301, or verification results 323 of the PCB assembly 301. The layout design 321 can be a physical board layout design of the PCB assembly 301. The design data can include at least one of a component corresponding to the layout design 321 or the schematic design, a component parameter corresponding to the layout design 321 or the schematic design, a component connection corresponding to the layout design 321 or the schematic design, or a design verification result corresponding to the layout design 321 or the schematic design of the PCB assembly 301.

The video presentation tool 322 can synchronize the layout design 321 of the PCB assembly 301 with the captured image of the PCB assembly 301. In some embodiments, the video presentation tool 322 can automatically align portions of the layout design 321 of the PCB assembly 301 with components or other structures in the captured image of the PCB assembly 301. In other embodiments, the video presentation tool 322 can align the layout design 321 and the captured image in response to manual input to the video inspection system 320.

The video presentation tool 322 can utilize the synchronization between the layout design 321 of the PCB assembly 301 and the captured image of the PCB assembly 301 to selectively annotate the captured image of the PCB assembly 301 with design data from the layout design 321, the schematic design, or the verification results 323. For example, the video presentation tool 322, in response to a selection of a portion of the layout design 321, can annotate the portion of the captured image synchronized to the selected portion of the layout design 321 with design data corresponding to the selected portion of the layout design 321. The video presentation tool 322, in response to a selection of a portion of the schematic design, can correlate the selected portion of the schematic design to a section of the layout design 321, and annotate the captured image synchronized to the section of the layout design 321. In another example, the video presentation tool 322 can receive a selection of a portion of the captured image, for example, by identifying a location pointed to by a rework tool 303, and then annotate the selected portion of the captured image with design data from the layout design 321 synchronized with the selected portion of the captured image or from the schematic design correlated to the layout design 321. In some embodiments, the rework tool 303 can be a physical pointer capable of being recognized in the captured image by the video presentation tool 322, can be a laser pointer configured to project a light beam capable of being recognized in the captured image by the video presentation tool 322, or the like.

The rework tool 303 also can be a measurement device, such as a volt-meter, an oscilloscope, or the like, which can provide measurements taken from the PCB assembly 301 to the video inspection system 320. In some embodiments, the video presentation tool 322 can augment the captured image with the measurements from the rework tool 303. The video presentation tool 322 also can compare the measurements taken by the rework tool 303 to expected measurements, for example, from the verification results 323, and annotate the captured image with results corresponding to the comparison. In some examples, the video presentation tool 322 can determine whether a measurement taken by the rework tool 303 deviates from the expected measurement in the verification results 323, and annunciate the deviation, lack thereof, and/or a difference between the measurement and the expected measurement. Embodiments of the augmentation of the captured image of the PCB assembly 301 with design data will be described below in greater detail.

Figure 4:
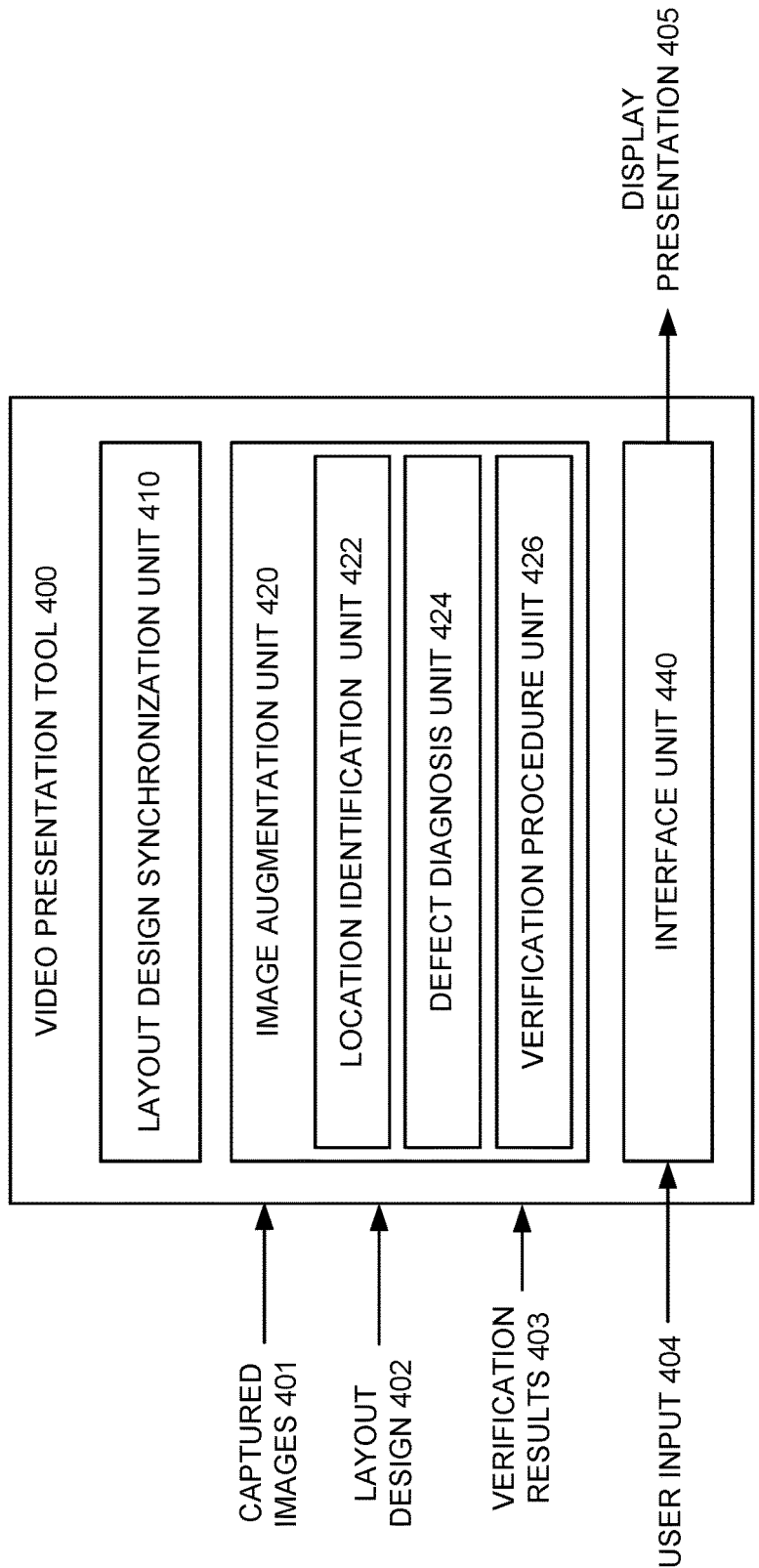
FIG. 4 illustrates an example video presentation tool according to various examples of the invention.

FIG. 4 illustrates an example video presentation tool according to various examples of the invention. Referring to FIG. 4, the video presentation tool 400 can include a layout design synchronization unit 410 to receive captured images 401 or video of a printed circuit board assembly, for example, from image capture devices. The layout design synchronization unit 410 can merge or aggregate the captured images 401 or video of the PCB assembly into a two-dimensional or three-dimensional image or video, which can be output from the video presentation tool 400 via an interface unit 430 as a display presentation 405.

The layout design synchronization unit 410 also can receive a layout design 402 of the PCB assembly, for example, from a layout design tool utilized to generate the layout design 402. The layout design 402 can be a physical board layout design, a schematic design, or the like. The layout design synchronization unit 410 can synchronize the layout design 402 with the captured image of the PCB assembly. In some embodiments, the layout design synchronization unit 410 can automatically align portions of the layout design 402 of the PCB assembly with components or other structures in the captured image of the PCB assembly. For example, the layout design synchronization unit 410 can utilize optical pattern matching to identify various components or other structures in the captured image or video and then link those identified structures to portions of the layout design 402. In other embodiments, the layout design synchronization unit 410 can align the layout design 402 and the captured image in response to user input 404 receive via the user interface 430 in the video presentation tool 400.

The video presentation tool 400 can include an image augmentation unit 420 to augment the captured image or video with design data from the layout design 402 of the PCB assembly or from verification results 403 corresponding to the PCB assembly. The design data can include at least one of a component of the PCB assembly, a component parameter of the PCB assembly, a component connection of the PCB assembly, or a design verification result 403 corresponding to the layout design 401 of the PCB assembly. The image augmentation unit 420 can output the augmented captured image or video from the video presentation tool 400 via the interface unit 430 as the display presentation 405.

The image augmentation unit 420 can include a location identification unit 422 to locate a section in the captured image or video. In some embodiments, the location identification unit 422 can receive an identification of a portion of the layout design 402, for example, in the form of the user input 404 via the interface unit 430. The location identification unit 422 can utilize the synchronization between the layout design 402 and the captured image or video to locate the section in the captured image or video that corresponds to the identified portion of the layout design 402. The location identification unit 422 can selectively annotate the located section in the captured image or video with design data corresponding to the identified portion of the layout design 402. The design data can include information from the layout design 402 or verification results 403 correlated to the layout design 402.

The location identification unit 422 also can receive a selection of a portion of the captured image or video that corresponds to the PCB assembly, for example, by identifying a location pointed to by a rework tool. In some embodiments, the rework tool can be a physical pointer capable of being recognized in the captured image by the location identification unit 422, can be a laser pointer configured to project a light beam capable of being recognized in the captured image or video by the location identification unit 422, or the like. The location identification unit 422 also can annotate the selected portion of the captured image or video with design data from the layout design 402 synchronized with the selected portion of the captured image or video.

The image augmentation unit 420 can include a defect diagnosis unit 424 to annotate the captured image or video with information corresponding to operations to be performed during a defect diagnosis procedure. The defect diagnosis unit 424 can annotate the captured image or video to highlight components and/or their connections to test. In some examples, the annotation in the captured image or video can include highlighting or otherwise annunciating the component or connection to test, include an indication of the type of test to perform, such as voltage measurement, current measurement, frequency measurement, or the like, and/or an expected result of the measurement, for example, corresponding to one or more of the verification results 403.

The defect diagnosis unit 424, in some embodiments, can receive results of the measurements performed during the test. For example, the results can be received as user input 404 via the interface unit 430, or automatically received via a connection to the rework tool or other measurement device. The defect diagnosis unit 424, in response to receive the results of the measurements performed during the test, can perform a variety of additional operations and annotations. In some embodiments, the defect diagnosis unit 424 can annotate the captured image or video with the results of the measurements performed during the test. The defect diagnosis unit 424 can annotate the captured image or video with a next test to perform in response to receiving the results of the measurements performed during the test. In some embodiments, the defect diagnosis unit 424 can compare the received results of the measurements performed during the test to expected results, for example, from the verification results 403. The defect diagnosis unit 424 can annotate the captured image or video with results of the comparison, for example, to annunciate whether the measurements of the PCB assembly deviate from the expected results.

The image augmentation unit 420 can include a verification procedure unit 426 to annotate the captured image or video with information corresponding to operations to be performed to verify operation of a repaired or refinished PCB assembly conforms to the verification results 403. The verification results 403 can correspond to simulated or emulated operation of the layout design 402. The verification procedure unit 426 can annotate the captured image or video to highlight components and/or their connections to test for verification of functional operation. In some examples, the annotation in the captured image or video can include highlighting or otherwise annunciating the component or connection to test, include an indication of the type of verification test, such as voltage measurement, current measurement, frequency measurement, or the like, to perform, and/or an expected result of the measurement, for example, corresponding to one or more of the verification results 403.

The verification procedure unit 426, in some embodiments, can receive results of the measurements performed during the verification test. For example, the results can be received as user input 404 via the interface unit 430, or automatically received via a connection to the rework tool or other measurement device. The verification procedure unit 426, in response to receive the results of the measurements performed during the verification test, can perform a variety of additional operations and annotations. In some embodiments, the verification procedure unit 426 can annotate the captured image or video with the results of the measurements performed during the verification test. The verification procedure unit 426 can annotate the captured image or video with a next verification test to perform in response to receiving the results of the measurements performed during the test. In some embodiments, the verification procedure unit 426 can compare the received results of the measurements performed during the verification test to expected results, for example, from the verification results 403. The verification procedure unit 426 can annotate the captured image or video with results of the comparison, for example, to annunciate whether the measurements of the PCB assembly deviate from the expected results.

Figure 5:
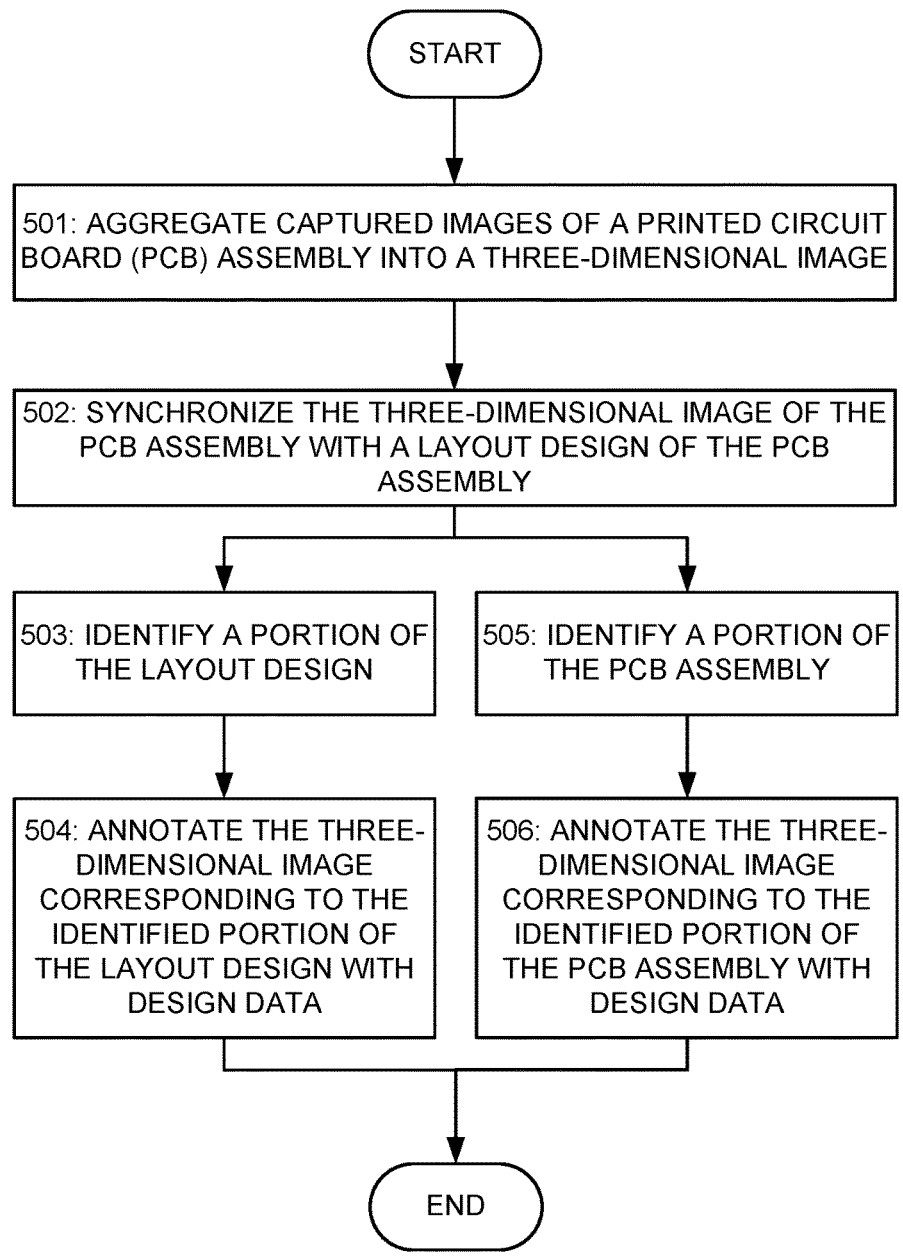
FIG. 5 illustrates an example flowchart for design-driven printed circuit board assembly image annotation according to various embodiments of the invention.

FIG. 5 illustrates an example flowchart for design-driven printed circuit board assembly image annotation according to various embodiments of the invention. Referring to FIG. 5, in a block 501, a computing system, for example, implementing the video presentation tool, can aggregate captured images of a printed circuit board (PCB) assembly into a two-dimensional or three-dimensional image. In some examples, image capture devices can capture the images of the PCB assembly from different locations. The computing system can merge or aggregate the captured images of the PCB assembly into the three-dimensional image or video be aligning the printed circuit board, components, connections, or other structures of the PCB assembly of the captured images.

In a block 502, the computing system can synchronize the captured image of the PCB assembly with a layout design of the PCB assembly. The layout design can be a physical board layout design of the PCB assembly, a schematic design of the PCB assembly, or the like. In some embodiments, the computing system can automatically align portions of the layout design with components or other structures in the captured image of the PCB assembly. For example, the computing system can utilize optical pattern matching to identify various components or other structures in the captured image or video and then link those identified structures to portions of the layout design. In other embodiments, the computing system can align the layout design and the captured image in response to user input.

In a block 503, the computing system can identify a portion of the layout design. In some embodiments, the computing system can receive user input selecting a portion of the layout design. For example, the computing system can present the layout design on a display device, and receive user input selecting a portion of the presented layout design.

In a block 504, the computing system can annotate the captured image corresponding to the identified portion of the layout design with design data. The computing system can utilize the synchronization between the layout design the captured image to locate a section in the captured image that corresponds to the identified portion of the layout design. The computing system can selectively annotate located section in the captured image with the design data corresponding to the identified portion of the layout design. The design data can include information from the layout design, such as a component, component parameters, component connections, or verification results correlated to the layout design.

In a block 505, the computing system can identify a portion of the PCB assembly. In some embodiments, the computing system can receive a selection of a portion of the captured image, for example, by identifying a location pointed to by a rework tool. In some embodiments, the rework tool can be a physical pointer capable of being recognized in the captured image by the computing system, can be a laser pointer configured to project a light beam capable of being recognized in the captured image by the computing system, or the like.

In a block 506, the computing system can annotate the image corresponding to the identified portion of the PCB assembly with design data. The computing system can utilize the synchronization between the layout design the captured image to locate a section in layout design that corresponds to the identified portion of the captured image. The computing system can selectively annotate identified portion in the captured image with design data corresponding to the located portion of the layout design. The design data can include information from the layout design, such as a component, component parameters, component connections, or verification results correlated to the layout design.

Figure 6:
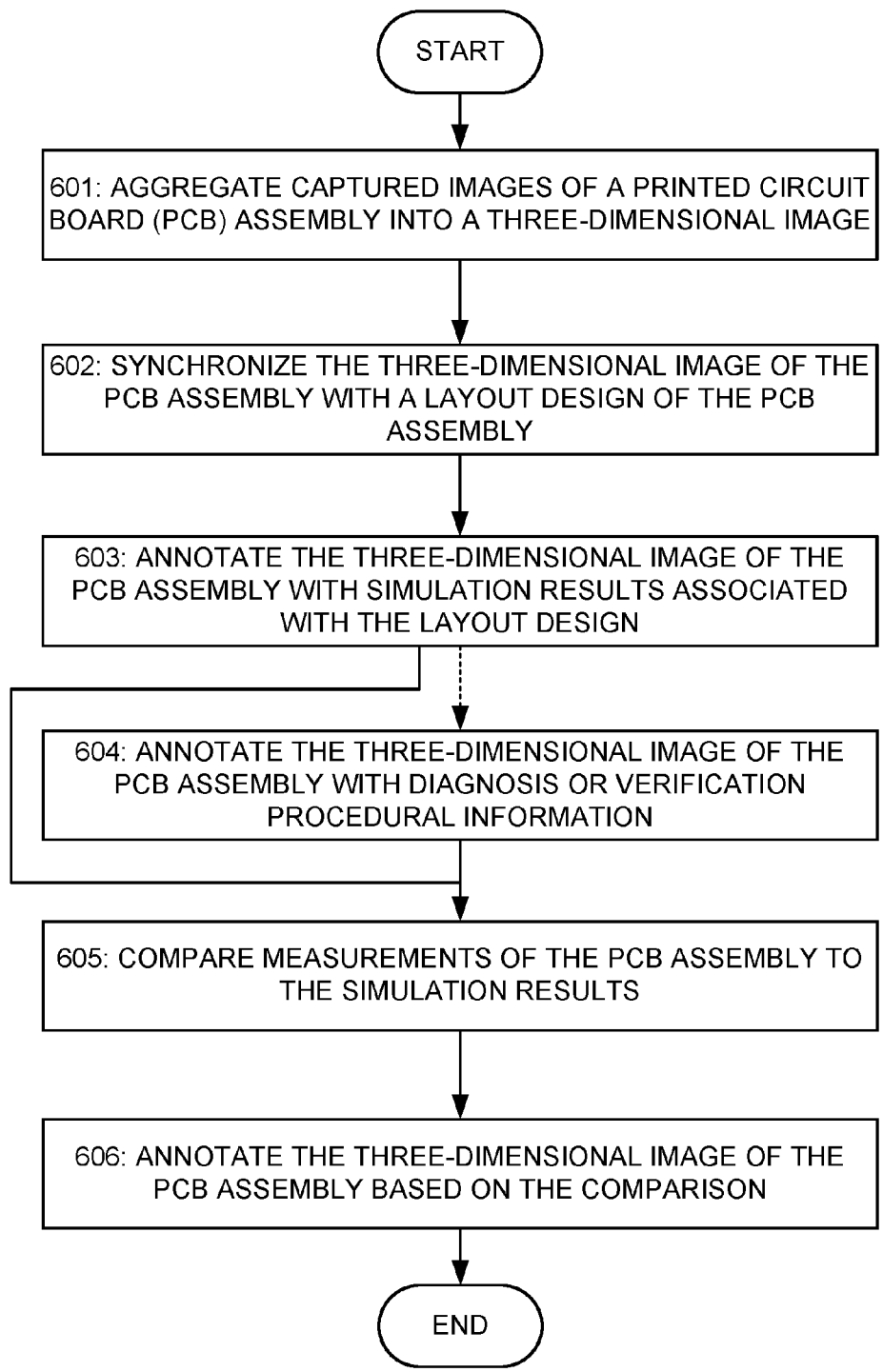
FIG. 6 illustrates an example flowchart for design simulation aided defect diagnosis or verification according to various embodiments of the invention.

FIG. 6 illustrates an example flowchart for design simulation aided defect diagnosis or verification according to various embodiments of the invention. Referring to FIG. 6, in a block 601, a computing system, for example, implementing the synchronization and augmentation tool, can aggregate captured images of a printed circuit board (PCB) assembly into a two-dimensional or three-dimensional image. In some examples, image capture devices can capture the images of the PCB assembly from different locations. The computing system can merge or aggregate the captured images of the PCB assembly into the three-dimensional image or video be aligning the printed circuit board, components, connections, or other structures of the PCB assembly of the captured images.

In a block 602, the computing system can synchronize the captured image of the PCB assembly with a layout design of the PCB assembly. The layout design can be a physical board layout design of the PCB assembly, a schematic design of the PCB assembly, or the like. In some embodiments, the computing system can automatically align portions of the layout design with components or other structures in the captured image of the PCB assembly. For example, the computing system can utilize optical pattern matching to identify various components or other structures in the captured image or video and then link those identified structures to portions of the layout design. In other embodiments, the computing system can align the layout design and the captured image in response to user input.

In a block 603, the computing system can annotate the captured image of the PCB assembly with simulation or other verification results associated with the layout design. The computing system can utilize the synchronization between the layout design the captured image to locate the simulation or other verification results that correspond to a particular portion of captured image of the PCB assembly.

In a block 604, the computing system can annotate the image of the PCB assembly with diagnosis or verification procedural information. The block 604 can be optionally performed by the computing system to annunciate instructions for performing a defect diagnosis procedure or a verification procedure. For example, the computing system can highlight or otherwise annunciate locations in the captured image of components or their connections to test for verification or defect detection, and optional identify a type of test, an order of operations, an expect measured value or value range in response to the test, or the like.

In a block 605, the computing system can compare measurements of the PCB assembly to the simulation or verification results. The computing system can receive the measurements of the electrical characteristics of the PCB assembly, such as voltage, current, frequency, or the like, via manual input or directly from a test tool, such as a voltmeter, oscilloscope, or the like. The computing system, in some embodiments, can detect a location of the test tool in the captured image to determine which simulation or verification result to utilize in the comparison. For example, the computing system can identify that a specific component connection is being measured by the test tool, identify a portion of the layout design that corresponds to the specific component connection, identify the simulation or verification results that correspond to the portion of the layout design, and then compare the measurement from the test tool against the identified simulation or verification results.

In a block 606, the computing system can annotate the captured image of the PCB assembly based on the comparison. In some embodiments, the computing system can add the simulation or verification results and the measurements to the captured image of the PCB assembly. The computing system also can identify if the measurements deviate from the simulation or verification results, and annunciate a presence of a deviation or lack thereof.

The system and apparatus described above may use dedicated processor systems, micro controllers, programmable logic devices, microprocessors, or any combination thereof, to perform some or all of the operations described herein. Some of the operations described above may be implemented in software and other operations may be implemented in hardware. Any of the operations, processes, and/or methods described herein may be performed by an apparatus, a device, and/or a system substantially similar to those as described herein and with reference to the illustrated figures.

The processing device may execute instructions or "code" stored in memory. The memory may store data as well. The processing device may include, but may not be limited to, an analog processor, a digital processor, a microprocessor, a multi-core processor, a processor array, a network processor, or the like. The processing device may be part of an integrated control system or system manager, or may be provided as a portable electronic device configured to interface with a networked system either locally or remotely via wireless transmission.

The processor memory may be integrated together with the processing device, for example RAM or FLASH memory included within an integrated circuit microprocessor or the like. In other examples, the memory may comprise an independent device, such as an external disk drive, a storage array, a portable FLASH key fob, or the like. The memory and processing device may be operatively coupled together, or in communication with each other, for example by an I/O port, a network connection, or the like, and the processing device may read a file stored on the memory. Associated memory may be "read only" by design (ROM) by virtue of permission settings, or not. Other examples of memory may include, but may not be limited to, WORM, EPROM, EEPROM, FLASH, or the like, which may be implemented in solid state semiconductor devices. Other memories may comprise moving parts, such as a known rotating disk drive. All such memories may be "machine-readable" and may be readable by a processing device.

Operating instructions or commands may be implemented or embodied in tangible forms of stored computer software (also known as "computer program" or "code"). Programs, or code, may be stored in a digital memory and may be read by the processing device. "Computer-readable storage medium" (or alternatively, "machine-readable storage medium") may include all of the foregoing types of memory, as well as new technologies of the future, as long as the memory may be capable of storing digital information in the nature of a computer program or other data, at least temporarily, and as long at the stored information may be "read" by an appropriate processing device. The term "computer-readable" may not be limited to the historical usage of "computer" to imply a complete mainframe, mini-computer, desktop or even laptop computer. Rather, "computer-readable" may comprise storage medium that may be readable by a processor, a processing device, or any computing system. Such media may be any available media that may be locally and/or remotely accessible by a computer or a processor, and may include volatile and non-volatile media, and removable and non-removable media, or any combination thereof.

A program stored in a computer-readable storage medium may comprise a computer program product. For example, a storage medium may be used as a convenient means to store or transport a computer program. For the sake of convenience, the operations may be described as various interconnected or coupled functional blocks or diagrams. However, there may be cases where these functional blocks or diagrams may be equivalently aggregated into a single logic device, program or operation with unclear boundaries.

CONCLUSION

While the application describes specific examples of carrying out embodiments of the invention, those skilled in the art will appreciate that there are numerous variations and permutations of the above described systems and techniques that fall within the spirit and scope of the invention as set forth in the appended claims.

One of skill in the art will also recognize that the concepts taught herein can be tailored to a particular application in many other ways. In particular, those skilled in the art will recognize that the illustrated examples are but one of many alternative implementations that will become apparent upon reading this disclosure.

Although the specification may refer to "an", "one", "another", or "some" example(s) in several locations, this does not necessarily mean that each such reference is to the same example(s), or that the feature only applies to a single example.

The invention claimed is:

1. A method comprising:
   capturing an image of a printed circuit board (PCB) assembly;
   synchronizing, by a computing system, at least a portion of a layout design of the PCB assembly with the image of the PCB assembly;
   analyzing, by the computing system, the image of the PCB assembly to recognize that a rework tool points to a selected portion of the PCB assembly; and
   augmenting, by the computing system, the image of the PCB assembly corresponding to the selected portion of the PCB assembly pointed to by the rework tool to include the portion of the layout design of the PCB assembly based, at least in part, on the synchronization of the image of the PCB assembly and the portion of the layout design of the PCB assembly.

2. The method of claim 1, wherein augmenting the image of the PCB assembly further comprises annotating the image of the PCB assembly with design data that corresponds to the layout design of the PCB assembly, and wherein design data includes at least one of a component, a component parameter, a component connection, or a design verification result.

3. The method of claim 1, further comprising:
   in response to a selection of a portion of a schematic design of the PCB assembly, associating the selected portion of the schematic design to a section of the layout design;
   correlating the section of the layout design to a section in the image of the PCB assembly based on the synchronization of the image and the layout design; and
   annotating the section in the image of the PCB assembly to include design data from the selected portion of the schematic design.

4. The method of claim 1, further comprising:
   associating the selected portion in the PCB assembly to a section of the layout design based on the synchronization of the image and the layout design;
   correlating the section of the layout design to a portion of a schematic design of the PCB assembly; and
   annotating the selected portion in the image of the PCB assembly with the design data corresponding to the schematic design or highlighting the portion in the schematic design.

5. The method of claim 1, further comprises altering, by the computing system, the image of the PCB assembly to include instructions describing operations to be performed during a test procedure on the PCB assembly and include a type of electrical characteristic to measure during performance of the test procedure on components or connections in the PCB assembly.

6. The method of claim 5 further comprises:
   comparing, by the computing system, one or more measurements from the test to results of verification operations on the layout design; and
   annotating the image of the PCB assembly to identify results of the comparison.

7. The method of claim 1, wherein synchronizing the layout design of the PCB assembly with the image of the PCB assembly further comprises aligning components described in the layout design of the PCB assembly with components in the image of the PCB assembly.

8. A system comprising:
   a video capture system configured to capture an image of a printed circuit board (PCB) assembly;
   a computer, in response to execution of computer-executable instructions by a processing device in the computer, is configured to implement a presentation tool configured to synchronize at least a portion of a layout design of the PCB assembly with the image of the PCB assembly, analyze the image of the PCB assembly to recognize that a rework tool points to a selected portion of the PCB assembly, and augment the image of the PCB assembly corresponding to the selected portion of the PCB assembly pointed to by the rework tool to include the portion of the layout design of the PCB assembly; and
   a display device configured to present the augmented image of the PCB assembly.

9. The system of claim 8, wherein the computer implementing the presentation tool is further configured to annotate the image of the PCB assembly with design data that corresponds to the layout design, and wherein the design data includes at least one of a component, a component parameter, a component connection, or a design verification result.

10. The system of claim 8, wherein the computer implementing the presentation tool is further configured to associate a selected portion of a schematic design to a section of the layout design, correlate the section of the layout design to a section in the image of the PCB assembly based on the synchronization of the image and the layout design, and annotate the section in the image of the PCB assembly to include design data from the selected portion of the schematic design.

11. The system of claim 8, wherein the computer implementing the presentation tool is further configured to associate the selected portion in the PCB assembly to a section of the layout design based on the synchronization of the image and the layout design, correlate the section of the layout design to a portion of a schematic design of the PCB assembly, and annotate the selected portion in the image of the PCB assembly with the design data corresponding to the schematic design or highlight the portion in the schematic design.

12. The system of claim 8, wherein the computer implementing the presentation tool is further configured to alter the image of the PCB assembly to include instructions describing operations to be performed during a test procedure on the PCB assembly and include a type of electrical characteristic to measure during performance of the test procedure on components or connections in the PCB assembly.

13. The system of claim 12, wherein the computer implementing the presentation tool is further configured to:
compare one or more measurements from the test to results of verification operations on the layout design; and
annotate the image of the PCB assembly to identify results of the comparison.

14. An apparatus comprising at least one computer-readable memory device storing instructions configured to cause one or more processing devices to perform operations comprising:
synchronizing at least a portion of a layout design of a printed circuit board (PCB) assembly with a captured image of the PCB assembly;
analyzing the image of the PCB assembly to recognize that a rework tool points to a selected portion of the PCB assembly; and
augmenting the image of the PCB assembly corresponding to the selected portion of the PCB assembly pointed to by the rework tool to include the portion of the layout design of the PCB assembly based, at least in part, on the synchronization of the image of the PCB assembly and the portion of the layout design of the PCB assembly.

15. The apparatus of claim 14, wherein augmenting the image of the PCB assembly further comprises annotating the image of the PCB assembly with design data that corresponds to the layout design of the PCB assembly, and wherein the design data includes at least one of a component, a component parameter, a component connection, or a design verification result.

16. The apparatus of claim 14, wherein augmenting the image of the PCB assembly further comprises:
in response to a selection of a portion of a schematic design of the PCB assembly, associating the selected portion of the schematic design to a section of the layout design;
correlating the section of the layout design to a section in the image of the PCB assembly based on the synchronization of the image and the layout design; and
annotating the section in the image of the PCB assembly to include design data from the selected portion of the schematic design.

17. The apparatus of claim 14, wherein augmenting the image of the PCB assembly further comprises:
associating the selected portion in the PCB assembly to a section of the layout design based on the synchronization of the image and the layout design;
correlating the section of the layout design to a portion of a schematic design of the PCB assembly; and
annotating the selected portion in the image of the PCB assembly with the design data corresponding to the schematic design or highlighting the portion in the schematic design.

18. The apparatus of claim 14, further comprises altering the image of the PCB assembly to include instructions describing operations to be performed during a test procedure on the PCB assembly and include a type of electrical characteristic to measure during performance of the test procedure on components or connections in the PCB assembly.

19. The apparatus of claim 18, wherein altering the image of the PCB assembly to include instructions for a test procedure to be performed on the PCB assembly further comprises:
comparing, by the computing system, one or more measurements from the test to results of verification operations on the layout design; and
annotating the image of the PCB assembly to identify results of the comparison.

20. The apparatus of claim 14, wherein synchronizing the layout design of the PCB assembly with the image of the PCB assembly further comprises aligning components described in the layout design of the PCB assembly with components in the image of the PCB assembly.

* * * * *